July 1, 1952  D. W. DOUGLAS  2,601,962
AIRCRAFT BALANCING MEANS
Filed Jan. 29, 1946  2 SHEETS—SHEET 1
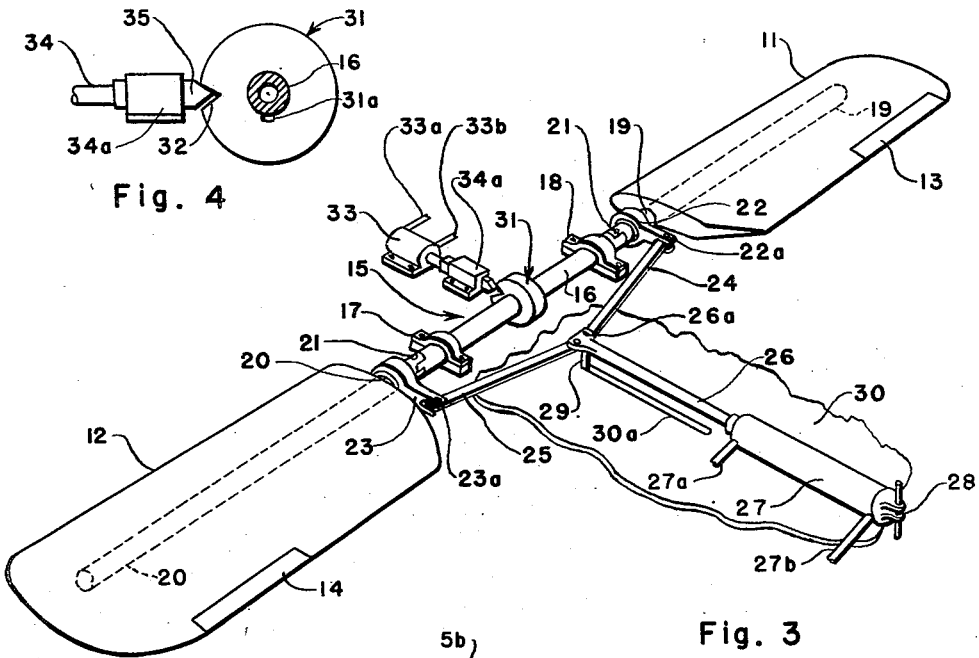
Fig. 4
Fig. 3
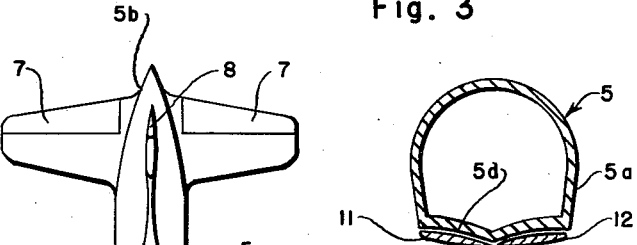
Fig. 2
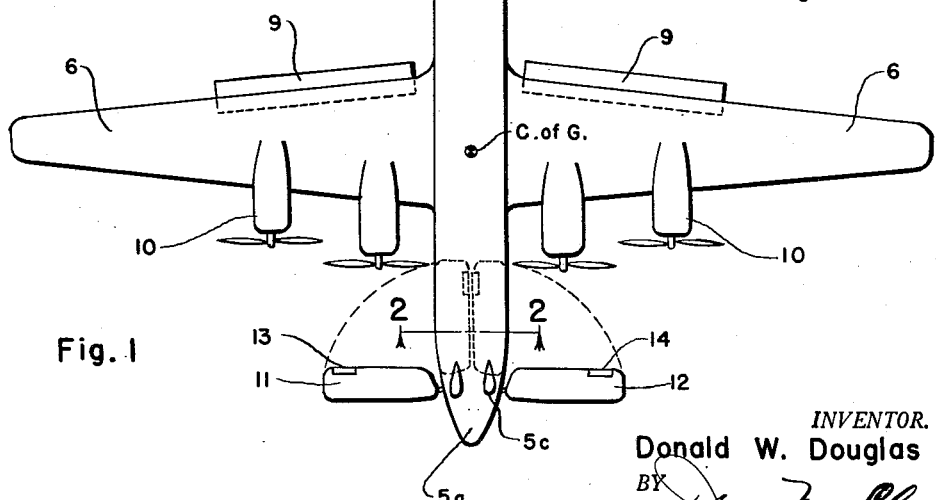
Fig. 1
INVENTOR.
Donald W. Douglas
BY
HIS PATENT ATTORNEY July 1, 1952     D. W. DOUGLAS     2,601,962
AIRCRAFT BALANCING MEANS Filed Jan. 29, 1946     2 SHEETS—SHEET 2

Donald W. Douglas
*INVENTOR.*

BY
HIS PATENT ATTORNEY

Patented July 1, 1952

2,601,962

UNITED STATES PATENT OFFICE 2,601,962

AIRCRAFT BALANCING MEANS

Donald W. Douglas, Santa Monica, Calif., assignor to Douglas Aircraft Company, Inc., a corporation of Delaware Application January 29, 1946, Serial No. 644,088

16 Claims. (Cl. 244—42)

This invention relates to the arrangement of the sustaining and control surfaces of aircraft and more particularly to improvements in auxiliary lift and balancing means.

It is well known that in conventional aircraft having a rearwardly located empennage and a forwardly disposed main wing, the rearward extension of the flaps with respect to the trailing edge of the wing creates a nose-down pitching moment on the airplane about its center of gravity. This condition is created by the rearward shifting of the center of pressure of the wing-flap combination with respect to the center of gravity of the airplane and is normally counteracted by the application of a negative load to the horizontal tail surfaces by upward rotation of the elevators. This increase in negative load upon the tail surfaces, while correcting the nose-diving moment and restoring longitudinal stability, is disadvantageous inasmuch as it materially increases the total wing loading of the airplane. The increased wing loading has other undesirable results such as a reduction in the operating capacity and efficiency of the airplane, and causes higher stressing of the structure. It further increases the difficulty of landing and take-off operations due to the necessity for increased speed under these conditions incidental to the increase in the stalling speed.

It has heretofore been proposed by the prior art to provide a forward lifting surface to counteract this downward pitching movement. The prior art has also suggested forward airfoils capable of variable incidence, as well as fixed airfoils having high lift flaps associated with their trailing edges. These prior suggested structures, however, present certain problems and disadvantages, and do not contribute to the efficient operation of the aircraft particularly during either cruising or high speed flight in which these auxiliary lifting means are not normally required.

These prior difficulties and disadvantages have been largely overcome by the present invention in which an otherwise conventional airplane is provided with retractable floating surfaces disposed in the region of the nose portion of the fuselage. These floating surfaces are free to rotate about a lateral or transverse axis and may be trimmed to any desired angle of attack by means of a controllable trim tab or similar device associated with the trailing edges of the floating surfaces. These auxiliary surfaces do not decrease the stability of the airplane and offer an advantage over prior fixed surfaces at the nose of the fuselage for normal cruising or high speed flight of the airplane.

The present invention contemplates unique operating mechanism for extending the surfaces to their operative position and retracting the same to a stowed position beneath the nose portion of the airplane in which they offer relatively little resistance to flight. The invention also embodies the provision of actuating mechanism whereby the auxiliary surfaces may be simultaneously extended with the main wing flaps in order to provide a minimum disturbance to the longitudinal stability of the airplane. This mechanism also includes a centering device whereby the auxiliary surfaces are maintained in their neutral attitude during retraction and extension, or can be maintained in this attitude in the extended or retracted position when desired. Another feature of the invention is the provision of trim tabs or similar means associated with the trailing edges of the airfoils by means of which their angle of incidence may be changed at the will of the pilot.

It is accordingly a primary object of the present invention to provide auxiliary lift surfaces in the region of the nose of an otherwise conventional airplane provided with wing flaps. A further object resides in the provision of such auxiliary lift surfaces which maintain the longitudinal stability of the airplane and which may be concurrently extended as the wing flaps are projected rearwardly of the main wing. It is a further object to provide such auxiliary lift surfaces which are freely floatable about a transverse axis and which may be controlled with respect to their angle of incidence by means of the aforementioned trim tabs associated with the trailing edges of these surfaces.

It is a further objective of the present invention to provide auxiliary lift surfaces adjacent the nose portion of an airplane, which surfaces may be retracted into a faired position with respect to the fuselage in order that resistance to flight is reduced at such time when the additional lift is not required. Other objects and advantages reside in the general arrangement of the retractable auxiliary surfaces, the manner in which they are centered, locked and supported upon the aircraft and the mechanism by which they are extended and retracted as well as operated in their extended position.

Other objects and advantages will occur to those skilled in the art after reading the present specification taken together with the accompanying drawings forming a part hereof, in which:

Fig. 1 is a plan view of an airplane to which the improved auxiliary lift means comprising this invention has been applied;

Fig. 2 is a transverse sectional view of the nose portion of the fuselage taken along the lines 2—2 of Fig. 1 showing the auxiliary surfaces in their retracted positions;

Fig. 3 is a perspective view of the auxiliary lift surfaces and the mechanism for extending, retracting and centering the same;

Fig. 4 is a detailed view of the centering and locking mechanism;

Figure 6:
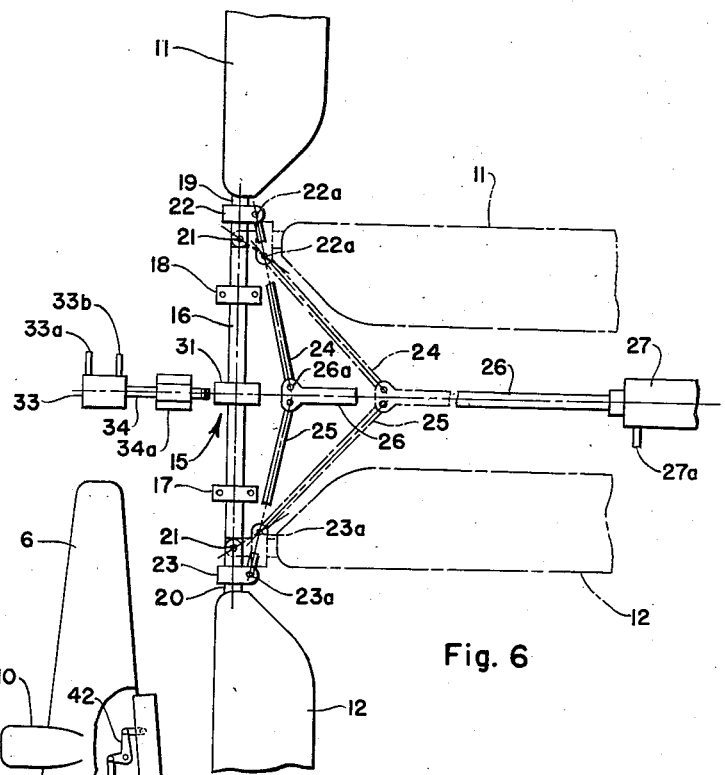
Fig. 6 is a plan view of the mechanism shown in Fig. 3 showing the auxiliary lift surfaces in both their extended and retracted positions.

Referring now to Figs. 1 and 2 there is shown an airplane having a fuselage 5, main sustaining surfaces 6, elevators 7 and rudder 8 in the tail portion 5b. Rearwardly extendable high lift flaps 9 of any of the conventional types are associated with the trailing edges of the wings 6. The airplane is provided with a plurality of power plant and propeller propulsion units 10 supported uon the wings 6, and the nose portion 5a of the fuselage is provided with a control compartment provided with observation windshield or "bug-eyes" 5c. As described to this point the airplane and the arrangement of its major components may be of an otherwise conventional type.

The fuselage of the airplane is provided in accordance with this invention in the region of its nose portion 5a with a pair of retractable free floating vanes or auxiliary lift surfaces 11 and 12 which are preferably positioned as close to the nose of the fuselage as practicable. In the case of an airplane having a tricycle landing gear the nose vanes would normally be disposed either rearwardly or on each side of the nose wheel. As indicated in the cross-section in Fig. 2, the underside of the fuselage 5 adjacent its nose portion 5a is cambered or recessed as at 5d to receive the vanes 11 and 12 when they are retracted and to thereby present a substantially smooth and faired lower fuselage surface to the airstream. Trim tabs 13 and 14 are preferably controllably mounted upon the vanes 11 and 12.

Referring now to Figs. 3 and 6 the free floating vanes 11 and 12 are interconnected by a transversely aligned shaft assembly 15 which preferably continues through as the spar elements of the floating vanes. The assembly 15 comprises a central shaft portion 16 which is rotatably supported upon the fuselage structure within the bearings 17 and 18 and is axially aligned with the outer or end spar shaft portions 19 and 20. The inner portions of the outer shafts 19 and 20 are pivotally connected by the horizontally tongued flexible joints 21. The pivot pins of the connections 21 are vertically disposed in the normal flight attitude of the vanes 11 and 12 such that they transmit substantially vertical lift forces but are adapted to be folded rearwardly within a horizontal plane for retraction of the vanes.

Longitudinally fixed guide links 22 and 23 are rotatably mounted upon inner portions of the spar shafts 19 and 20 adjacent the inner edges of the vanes 11 and 12. These guide link members 22 and 23 are preferably provided with anti-friction bearings which embrace collar portions keyed or otherwise fixed against axial movement along the spar shafts 19 and 20. The rearward extremity of each of the guide links 22 and 23 is attached to the opposite terminals of the connecting links 24 and 25 by means of the vertically disposed pivotal connections 22a and 23a. The adjacent inner ends of the links 24 and 25 are each pivotally connected to the forward terminal 26a of the piston rod 26 translatable in a fore-and-aft direction with respect to the fluid actuating cylinder or motor 27. Hydraulic lines 27a and 27b communicate with the end portions of the actuating cylinder 27 which may preferably be pivotally mounted upon the aircraft structure as by the pivot pin 28, these lines or conduits 27a and 27b being connected to the hydraulic actuating system shown in Fig. 5 and more fully described below.

The forward portion of the piston rod 26 in the region of its pivotal connection 26a is provided with a downwardly projecting pin 29 which is adapted to slide in a fore-and-aft or longitudinal direction within a slot 30a formed in the substantially horizontal plate 30 supported upon the fuselage structure. This lateral restraint of the piston rod terminal 26a relieves the piston rod 26 of binding tendencies and assists in synchronizing the movement of the vanes 11 and 12 as they are extended or retracted.

A centering device 31 is keyed or otherwise fixedly attached as at 31a to the central portion of the shaft 16 to center and hold the vanes 11 and 12 in their neutral positions before and after they are retracted to the under side of the airplane fuselage, or to lock them rigidly in their neutral extended positions when conditions may require. This centering device comprises essentially the disc 31 provided with a V-shaped notch 32 which is positioned in such manner that the center line of the notch is horizontal or parallel with the plane of the vanes 11 and 12 when they are in their neutral position.

A fluid operating cylinder or motor 33 is preferably positioned in front of and aligned with the axis of the shaft 16, being provided with a piston rod 34 extending from the cylinder 33 through a supporting guide member 34a adjacent the disc 31. The piston rod 34 is preferably provided with a pointed or V-shaped end portion 35 correspondingly shaped with respect to the notch 32 in the disc 31 within which it is adapted to fit upon extension of the piston rod 34 toward the shaft 16. The pointed rod end 35 is preferably formed slightly smaller or sharper than the notch 32 in order that rearward movement of the piston, when the notch in the disc is slightly off center, causes the pointed end 35 to engage either edge of the notch 32 to center the vanes by rotation of the disc slightly to its centered or neutral position. It will be understood that as the point of the terminal 35 reaches the bottom or base of the notch 32 the disc 31 will be accurately positioned and further rotation of the shaft 16, together with the vanes 11 and 12, will be prevented as long as the terminal 35 remains in this locked position.

In order to retract the vanes 11 and 12, the fluid is first directed to the cylinder 33 through the inlet conduit 33a causing the piston rod 34 to be extended rearwardly toward the shaft 16 and at the same time causing fluid within the cylinder to be displaced through the outlet conduit 33b. The rearward extension of the piston rod 34 causes engagement of the V- shaped rod end 35 with the latch 32 as explained above, to thereby bring the vanes to a neutral position and prevent further rotation. Fluid is then directed into the cylinder 27 through the inlet conduit 27a causing the piston and its attached rod 26 to be drawn rearwardly while at the same time displacing fluid from the cylinder through the outlet conduit 27b. The links 24 and 25 which are pivotally connected to the piston rod terminal 26a are thereby moved rearwardly by the piston rod 26 in such manner that the guide links 22 and 23 are drawn inwardly about the pivotal axis of the pins 21.

It should be noted that the joints 21 can only be "broken" or the linkages 22—23 and 24—25 retracted while the vanes are in their neutral or horizontal positions and the pins 21 substantially vertical. Inasmuch as these guide links 22 and 23 are longitudinally immovable on the shafts 19 and 20, the shaft ends are caused to swing rearwardly about the vertical pivots 21 without rotation about their own axes, thus moving the vanes 11 and 12 (to which they are attached) to their retracted positions within the recesses 5d formed on the under-side of the fuselage 5. It will accordingly be noted that the vanes 11 and 12 are laterally aligned in their extended position such that the shaft portions 19 and 20 form a continuous laterally aligned spar in conjunction with the central shaft portion 16 and that the vanes are retracted from this position into the dotted line position shown in Fig. 1 in which these spar portions are parallel to each other and to the longitudinal fore-and-aft axis of the airplane.

By reference to Fig. 1, it will be noted that the relationship of the main sustaining surfaces 6 with respect to the fuselage 5, the tail group 7 and 8, and the center of gravity (C. G.) of the airplane is substantially conventional if we disregard the balancing means 11 and 12 at the nose portion 5a. In landing such a conventional type airplane the lowering and extending of the trailing edge flaps 9 on the wings 6 causes the wing to contribute a nose down pitching moment as a result of the center of pressure of the wingflap combination moving rearwardly of the C. G. In order to counteract this diving moment on the airplane, a down-load is required on the tail surfaces by rotating the elevators upwardly. This down-load is objectionable and undesirable, however, since it reduces the net lift obtainable and necessary to maintaining the load and safe stalling speed. In both landing and take-off operations this nose-down moment greatly effects the longitudinal stability of the airplane as well as its load carrying qualities and submits the pilot to an additional burden in the proper and safe handling on the craft. These conditions and difficulties are eliminated and overcome by the retractable floating surfaces 11 and 12 provided at the nose of the fuselage. Subsequent to the extension of these nose vane surfaces prior to landing or take-off the centering device 33—35 is retracted to permit the floating surfaces to freely rotate about the axis of the spar members 19 and 20 in a lateral direction with respect to the fuselage.

Figure 5:
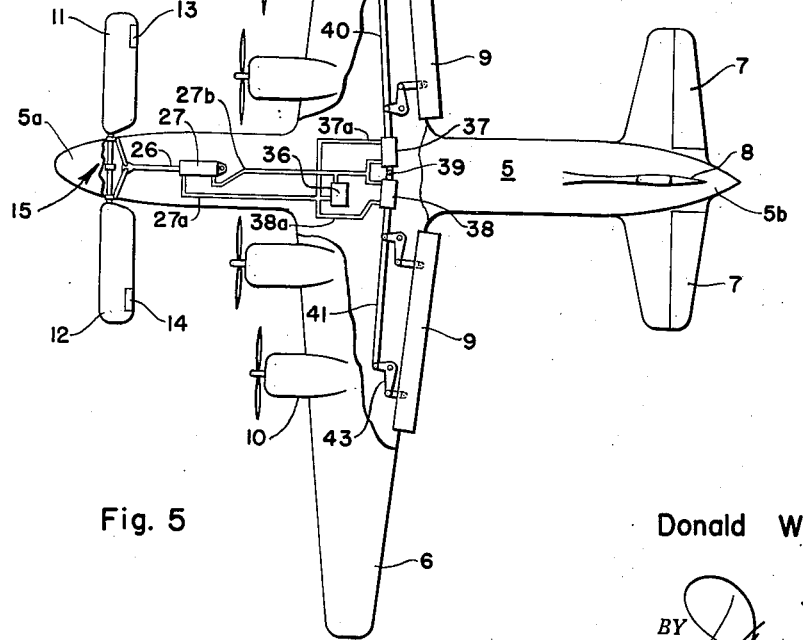
Fig. 5 is a further plan view of the airplane of Fig. 1 showing a form of operating system for the auxiliary lift means and the high-lift flaps.

In a preferred embodiment of the invention the actuating mechanism for extending the flaps 9 is operatively interconnected with the actuating cylinder 27 in such manner that the nose vane surfaces 11 and 12 are simultaneously extended with the flaps. Such an embodiment for simultaneous hydraulic actuation is shown in Fig. 5 in which the numeral 36 represents a hydraulic pump suitably controlled and supplied with operating fluid to discharge at operating pressures into the conduits 27a, 37a, and 38a, to the hydraulic actuating motors 27, 37 and 38, respectively. As shown in Figs. 3 and 6, the hydraulic motor 27 extends and retracts the auxiliary lift surfaces 11 and 12, and the actuating motors 37 and 38 operate to extend and retract the trailing edge flaps 9. The hydraulic pump 36 is suitably controlled, either by reversible power means or by conventional valve control, to discharge fluid under pressure into either the conduit 27a (for retraction of the auxiliary surfaces 11 and 12, simultaneously with the retraction of the flaps 9) or to discharge into the conduit 27b for simultaneous extension of the auxiliary lift surfaces 11 and 12 and the flaps 9. The hydraulic actuating motors 37 and 38 may have their cylinder portions pivotally interconnected as at 39 and their piston elements are suitably connected to the push-pull rods 40 and 41, in turn pivotally connected to the bell-crank levers 42 and 43, which in turn are linked to the flaps 9. While the hydraulic actuating system shown in Fig. 5 serves to extend or retract the lift surfaces 11, 12 and flap 9 simultaneously, it will be understood that these surfaces may alternatively be extended mechanically, electrically, or by other means. In certain installations it might also be desirable to provide an automatic inter-connection between the actuating cylinder 27 for the nose vanes and the cylinder operating the centering device whereby the latter would be withdrawn as soon as the nose vanes were fully extended in order that they may be made freely floating immediately upon extension. The trim tabs 13 and 14 at the trailing edges of vanes 7 and 12 are preferably controllable by the pilot by means of suitable control mechanisms (not shown). In this manner it is possible for the floating surfaces to be trimmed to any desired angle of attack by means of the controllable trim tab or other similar devices on or behind the trailing edges of the surfaces 11 and 12. These floating surfaces accordingly tend to increase, rather than decrease, the longitudinal stability of the airplane and offer an advantage over prior fixed surfaces at the nose of the fuselage for the normal cruising flight condition of the airplane. In the latter cruising or high speed flight conditions the surfaces may be retracted or stowed beneath the nose portion of the fuselage in which they create relatively low drag. In landing, the surfaces are extended and exert the desired upload on the airplane to balance the pitching moment due to the extended flap and the resulting upload tends to increase, rather than decrease, the net lift obtainable, and they further reduce the stalling speed of the airplane. In this manner the airplane is adapted to carry greater loads safely since the maximum benefit is derived from the increased lift coefficient at landing speeds.

Other forms and modifications of the present invention, both with respect to its general arrangement and the details of the respective elements, are intended to come within the scope and spirit of the present invention as more particularly set forth in the appended claims.

I claim:

1. In an airplane having a body, a main sustaining surface attached to said body, an empennage group associated with the tail portion of said body, extendable lift increasing means associated with said sustaining surface tending upon extension to shift the center of pressure of said surface rearwardly, auxiliary lift means floatingly mounted upon the nose portion of said body arranged to compensate for said rearward shift in the center of pressure, and means operable to retract said auxiliary lift means during flight to a faired position beneath the body of said airplane.

2. A dive balance arrangement for an airplane having a body, main sustaining surfaces fixed to said body, high lift flaps associated with the trailing edges of said sustaining surfaces and a tail group associated with the rear portion of said body; comprising a pair of auxiliary surfaces pivotally mounted upon a transverse axis and normally freely floatable with respect to the aircraft body arranged to develop additional lift to balance that created by the said high lift trailing edge flaps, and means for retracting said auxiliary surfaces into faired positions beneath the body of the airplane.

3. The combination with an airplane having a fuselage, main sustaining surfaces attached to said fuselage, high lift flaps extendably associated with the trailing edges of said sustaining surfaces and an empennage disposed at the tail portion of said fuselage; of a pair of freely floatable auxiliary lift vanes pivotally mounted upon a transverse axis in the nose portion of said fuselage arranged to balance diving moments created by the extension of said high lift flaps, and means for retracting said auxiliary lift vanes into detracted positions beneath the nose portion of said fuselage.

4. In aircraft construction, the arrangement for balancing diving moments created by rearwardly extending wing flaps comprising: an auxiliary lift means pivotally supported upon a transverse axis at the nose portion of the airplane; said pivotal support arranged to provide a free floating condition of said auxiliary airfoil; trim tab means pivotally associated with the trailing edge of said auxiliary airfoil; control means associated with said trim tab means arranged for movement of said auxiliary airfoil into controlled positions to provide positive balancing lift; and means to retract said auxiliary airfoil from opposed laterally extending operative positions to adjacent longitudinally disposed inoperative positions in which they are faired against the nose portion of the airplane.

5. Balancing means for an airplane having a body, a main sustaining surface attached to said body and extendable flaps operatively associated with said sustaining surfaces tending upon extension to impart rearward travel to the center of pressure of said sustaining surface; said balancing means comprising a pair of normally floating auxiliary surfaces rotatably mounted on a transverse axis upon the nose portion of said body arranged to provide lift and to balance the diving moment created by the said flap operation and said rearward pressure travel, mechanism adapted for the extension and retraction of said auxiliary nose surfaces, and actuating means operatively connected to said flap means and to said mechanism for the simultaneous extension during flight of said flap means and said auxiliary nose surfaces.

6. In an airplane having a body, a main sustaining surface attached to said body in a spanwise direction, an empennage group associated with the tail portion of said body, and lift increasing means associated with said sustaining surface tending upon extension to initiate rearward movement of the center of pressure; balance means comprising a pair of surfaces pivotally mounted upon a spanwise axis at the nose portion of the body arranged to counteract the diving moment created by said rearward movement of the center of pressure; and mechanism arranged for the retraction during flight of said auxiliary surfaces from their spanwise extended position into adjacent longitudinally disposed positions in which they become faired beneath the lower surface of the body.

7. A dive balance arrangement for aircraft comprising; a transverse structural member having its central portion rotatably mounted upon the nose of an aircraft; airfoils mounted upon the transversely extending outer portions of said structural member; said airfoils arranged to freely float about the transverse axis of said rotatably mounted structural member; tab means operatively associated with said airfoils for controllably adjusting said airfoils into lift producing attitudes; and means operatively engaging said central portion of said structural member adapted to rotate said member and the attached airfoils into their neutral position and to fixedly retain the same with respect to the nose portion of the aircraft.

8. In aircraft, the arrangement for balancing diving moments comprising; a transverse spar assembly having its central portion rotatively mounted upon the nose portion of an aircraft; airfoils mounted upon the transversely extending outer portions of said spar assembly; pivotal joints disposed within said spar assembly between said airfoils and said central portion; said airfoils arranged to freely float in the airstream surrounding said aircraft about the transverse axis of said rotatively mounted spar assembly; controllable trim tabs associated with said airfoils for varying the lift of said airfoils to balance said diving moment; actuating mechanism associated with said outer airfoil portions of said spar assembly; and means operatively attached to said actuating mechanism arranged to fold and retract said airfoil portions during flight about said pivotal joints into a retracted position with respect to the nose portion of the aircraft.

9. Balancing means for aircraft having a fuselage, a main sustaining surface and extendable flaps operatively mounted upon said sustaining surface tending to impart longitudinal travel to the center of pressure of said sustaining surface with respect to the center of gravity of the aircraft; said balancing means comprising normally floating controllable auxiliary lift means remotely mounted upon the aircraft with respect to said sustaining surface arranged to provide lift and to controllably balance the disturbing moments created about the center of gravity of the aircraft by the said sustaining surface flap operation, and control mechanism for the extension and retraction of said auxiliary lift means into a faired position with respect to the fuselage.

10. In an aircraft having a fuselage, a main sustaining surface and extendable lift increasing means associated with said main sustaining surface tending upon the extension of said lift increasing means to shift the center of pressure of said sustaining surface in the direction of the longitudinal axis of the aircraft, normally floating auxiliary lift means operatively mounted upon the aircraft controllably arranged for the compensation of said longitudinal shift in the center of pressure, means for locking said auxiliary lift means in its neutral position and actuating means operable to retract said auxiliary lift means during flight from its neutral position to a faired position with respect to the fuselage.

11. A longitudinal balance arrangement for an aircraft having a main sustaining surface and high lift flaps operatively associated with said sustaining surface; comprising auxiliary lift means operatively mounted upon a transverse axis and normally freely floatable with respect to the aircraft, said auxiliary lift means arranged to develop additional lift to balance that created by the said high lift flaps, said auxiliary lift means also mounted upon a normally locked vertical pivot axis, and power means under the control of the pilot operatively connected to said high lift flaps and to said auxiliary lift means for simultaneously extending and retracting said high lift flaps and said auxiliary lift means about said vertical pivot axis into their extended and retracted positions.

12. In an aircraft having a main sustaining surface and extendable lift increasing means associated with said main sustaining surface tending upon extension to shift the center of pressure of said sustaining surface, auxiliary lift means pivotally mounted upon the aircraft upon a horizontal transverse axis arranged to compensate for said center of pressure shift, said auxiliary lift means also mounted upon a normally locked vertical pivot axis, control means operatively associated with said auxiliary lift means for changing its angle of attack about said horizontal transverse axis and actuating means operable to retract said auxiliary lift means by rotation about its vertical axis into a faired position with respect to the aircraft.

13. Balancing means for an airplane having a body, a main sustaining surface attached to said body and extendible flaps operatively associated with said sustaining surface tending upon extension to impart rearward travel to the center of pressure of said sustaining surface, said balancing means comprising a pair of auxiliary surfaces rotatably mounted upon the nose portion of said body arranged to provide lift and to balance the diving moment created by the said flap operation and said rearward pressure travel, mechanism for the extension and retraction of said auxiliary nose surfaces, actuating means operatively connected to said flap means and to said mechanism for the simultaneous extension during flight of said flap means and said auxiliary nose surfaces, and controllable trim tab means pivotally associated with the trailing edges of said auxiliary surfaces arranged for movement of said auxiliary surfaces into controlled positions to provide positive balancing lift.

14. Balancing means for aircraft having a fuselage, a main sustaining surface and extendible flaps operatively mounted upon said sustaining surface tending to impart longitudinal travel to the center of pressure of said sustaining surface with respect to the center of gravity of the aircraft; said balancing means comprising normally floating controllable auxiliary lift means remotely mounted upon the aircraft with respect to said sustaining surface arranged to provide lift and to controllably balance the disturbing moments created about the center of gravity of the aircraft by the said sustaining surface flap operation, actuating mechanism for the extension and retraction of said auxiliary lift means into a faired position with respect to the fuselage, and controllable trim tab means pivotally associated with the trailing edges of said auxiliary lift means arranged for movement of said auxiliary lift means into controlled positions to provide balancing lift.

15. In an aircraft having a fuselage, a main sustaining surface, an extensible lift increasing means associated with said main sustaining surface tending upon the extension of said lift increasing means to shift the center of pressure of said sustaining surface in the direction of the longitudinal axis of the aircraft, normally floating auxiliary lift means operatively mounted upon the aircraft controllably arranged for the compensation of said longitudinal shift in the center of pressure, means for locking said auxiliary lift means in its neutral position, actuating means operable to retract said auxiliary lift means during flight from said neutral position to a faired position with respect to the fuselage, and controllable trim tab means pivotally associated with the trailing edge of said auxiliary lift means arranged for movement of said auxiliary lift means into controlled positions to provide positive compensating lift.

16. A balance arrangement for aircraft comprising: a longitudinally extending fuselage; a transversely extending structural member having a central portion rotatably mounted upon said fuselage for rotation about a transverse axis; said structural member having an end portion pivotally mounted upon said central portion for rotation with said central portion about said transverse axis in an aligned position of said portions and for separate rotation with respect to said central portion about an axis normal to said transverse axis; an airfoil mounted upon said end portion of said transversely extending structural member; control means operatively associated with said airfoil for adjusting said airfoil about said transversely extending axis into lift producing attitudes in which said central and end portions of said structural member are transversely aligned; said airfoil arranged to pivot about the transverse axis of said aligned central and end portions of said structural member; and actuating means operatively engaging said end portion of said structural member arranged to retract said end portion and said airfoil about the normally disposed axis of said pivotal mounting into a faired position with respect to said fuselage.

DONALD W. DOUGLAS.

REFERENCES CITED

The following references are of record in the file of this patent:

UNITED STATES PATENTS

| Number | Name | Date |
|---|---|---|
| 1,073,100 | Davison | Sept. 16, 1913 |
| 1,262,535 | Mann | Apr. 9, 1918 |
| 1,524,352 | Gephart | Jan. 27, 1925 |
| 1,720,960 | Lilley | July 16, 1929 |
| 2,156,994 | Lachmann | May 2, 1939 |
| 2,203,396 | Sterhardt | June 4, 1940 |
| 2,271,226 | Johnson | Jan. 27, 1942 |
| 2,401,790 | Noyes | June 11, 1946 |
| 2,406,233 | Linnert | Aug. 20, 1946 |
| 2,414,898 | Rous | Jan. 28, 1947 |
| 2,424,882 | Gluhareff | July 29, 1947 |
| 2,428,194 | Bockrath | Sept. 30, 1947 |
| 2,430,793 | Wells | Nov. 11, 1947 |
| 2,470,602 | Campbell | May 17, 1949 |